United States Patent
Tashiro

(10) Patent No.: US 9,573,288 B2
(45) Date of Patent: Feb. 21, 2017

(54) CUTTING DATA GENERATOR, CUTTING APPARATUS AND NON-TRANSITORY COMPUTER-READABLE MEDIUM STORING CUTTING DATA GENERATING PROGRAM

(71) Applicant: Noriharu Tashiro, Nagoya (JP)

(72) Inventor: Noriharu Tashiro, Nagoya (JP)

(73) Assignee: Brother Kogyo Kabushiki Kaisha, Nagoya-shi (JP)

( * ) Notice: Subject to any disclaimer, the term of this patent is extended or adjusted under 35 U.S.C. 154(b) by 543 days.

(21) Appl. No.: 14/107,197

(22) Filed: Dec. 16, 2013

(65) Prior Publication Data

US 2014/0188268 A1  Jul. 3, 2014

(30) Foreign Application Priority Data

Dec. 27, 2012  (JP) .................. 2012-284945

(51) Int. Cl.
*B26F 1/38* (2006.01)
*B26D 5/00* (2006.01)

(52) U.S. Cl.
CPC ............. *B26F 1/3806* (2013.01); *B26D 5/005* (2013.01); *B26F 1/3846* (2013.01); *G05B 2219/45038* (2013.01)

(58) Field of Classification Search
CPC ..... B26F 1/3813; B26F 1/3806; B26F 1/3846; B26D 5/005; B26D 2007/2678; B26D 5/00; D05B 19/12; G05B 2219/45038; G05B 19/182
USPC ....................................................... 700/125
See application file for complete search history.

(56) References Cited

U.S. PATENT DOCUMENTS

| 3,633,286 | A |   | 1/1972 | Maurer |
| 3,875,389 | A |   | 4/1975 | McFadden et al. |
| 5,621,221 | A |   | 4/1997 | Shinohara et al. |
| 5,664,085 | A | * | 9/1997 | Morito .................. G06T 11/203 345/441 |
| 5,696,844 | A | * | 12/1997 | Takagi ..................... G06K 9/48 382/199 |
| 5,847,956 | A | * | 12/1998 | Bronfeld ................. G06T 17/10 345/420 |

(Continued)

FOREIGN PATENT DOCUMENTS

| JP | 2005-254707 A | 9/2005 |
| JP | 2014-124748 A | 7/2014 |
| JP | 2014-125711 A | 7/2014 |

*Primary Examiner* — Robert Fennema
*Assistant Examiner* — Shon Foley
(74) *Attorney, Agent, or Firm* — Fox Rothschild LLP

(57) ABSTRACT

A cutting data generator includes a control device configured to obtain provisional hole arrangement data usable to arrange a plurality of provisional holes and to obtain an intercentral distance between two of the provisional holes. The provisional holes are adjacent to each other. The control device is also configured to connect the provisional holes with an auxiliary hole and to determine that the provisional holes and the auxiliary hole are contained in a group, thereby extracting an outermost outline of the group of the provisional holes arranged, when the intercentral distance between the provisional holes is not less than a sum of radii of the provisional holes and not more than a predetermined value. The control device is further configured to generate cutting data usable to cut the sheet along the outline extracted. The auxiliary hole having a smaller diameter than the provisional holes.

12 Claims, 16 Drawing Sheets

(56) References Cited

U.S. PATENT DOCUMENTS

| | | | |
|---|---|---|---|
| 6,128,546 A * | 10/2000 | Basista | G05B 19/4205 |
| | | | 219/121.67 |
| 6,205,370 B1 | 3/2001 | Blaimschein et al. | |
| 6,295,370 B1 | 9/2001 | D'Hooge | |
| 6,359,251 B1 | 3/2002 | Picard et al. | |
| 6,925,353 B2 * | 8/2005 | Vollmayr | G05B 19/40935 |
| | | | 345/172 |
| 7,469,620 B2 | 12/2008 | Fagan | |
| 7,814,851 B2 * | 10/2010 | Tashiro | D05B 19/08 |
| | | | 112/102.5 |
| 8,270,709 B2 | 9/2012 | Lindbloom | |
| 9,089,982 B2 | 7/2015 | Tokura et al. | |
| 2003/0025696 A1 * | 2/2003 | Mulgan | G06T 11/203 |
| | | | 345/440 |
| 2003/0083850 A1 | 5/2003 | Schmidt et al. | |
| 2004/0083862 A1 | 5/2004 | Mikkelsen et al. | |
| 2005/0076998 A1 | 4/2005 | Buffum et al. | |
| 2005/0120844 A1 | 6/2005 | Weber | |
| 2007/0157776 A1 | 7/2007 | Sorensen et al. | |
| 2009/0064832 A1 | 3/2009 | Caretta et al. | |
| 2011/0073519 A1 | 3/2011 | Davis, II et al. | |
| 2011/0283849 A1 | 11/2011 | Takizawa | |
| 2012/0078406 A1 | 3/2012 | Lee et al. | |
| 2012/0234482 A1 | 9/2012 | Ihm | |
| 2012/0253504 A1 * | 10/2012 | Kawaguchi | B26F 1/3813 |
| | | | 700/187 |
| 2012/0330722 A1 * | 12/2012 | Volpe | G06Q 30/0201 |
| | | | 705/7.32 |
| 2013/0177215 A1 | 7/2013 | Campbell et al. | |
| 2013/0180374 A1 | 7/2013 | Abe et al. | |
| 2014/0000433 A1 | 1/2014 | Yamamoto et al. | |
| 2014/0182432 A1 | 7/2014 | Muto | |
| 2014/0182463 A1 | 7/2014 | Muto | |
| 2014/0283662 A1 | 9/2014 | Tokura | |

* cited by examiner

D2=Out(1)

D2=Out(1)

D2=Out(1)+Out(2)

| PROVISIONAL HOLE H(n) (where n is cutting order) | CENTRAL COORDINATE Cp(n)=(X,Y) | | HOLE SIZE RADIUS R |
|---|---|---|---|
| | X COORDINATE VALUE | Y COORDINATE VALUE | |
| H(1) | 5.0 | 5.0 | 1.0 |
| H(2) | 8.0 | 5.0 | 1.0 |
| H(3) | 11.0 | 5.0 | 1.0 |
| ... | ... | ... | ... |
| H(m) | 5.0 | 8.0 | 1.0 |

# CUTTING DATA GENERATOR, CUTTING APPARATUS AND NON-TRANSITORY COMPUTER-READABLE MEDIUM STORING CUTTING DATA GENERATING PROGRAM

CROSS-REFERENCE TO RELATED APPLICATIONS

This application is based upon and claims the benefit of priority from the prior Japanese Patent Application No. 2012-284945 filed on Dec. 27, 2012, the eat ire contents of which are incorporated herein by reference.

BACKGROUND

1. Technical Field

The present disclosure relates to a cutting data generator generating cutting data for forming holes in a sheet using a cutting apparatus, in which holes decorative pieces are disposed, the cutting apparatus and a non-transitory computer-readable medium storing a cutting data generating program.

2. Related Art

Clothes and small goods have conventionally been decorated with small granular decorative pieces or artificial gems called "rhinestones." A large number of decorative pieces are arranged on a surface of clothes or small goods into a desired pattern and thereafter fixed by an adhesive agent.

For example, a ruler formed with a large number of holes is used for the arrangement of decorative pieces. The holes have respective inner diameters slightly larger than outer diameters of the decorative pieces and are arranged in a plurality of patterns. A user selects holes composing a desired pattern from those of the ruler, putting the decorative pieces into the selected holes thereby to arrange the decorative pieces.

However, in use of the above-mentioned ruler, an arrangement of decorative pieces is limited to arrangements of holes formed in the ruler. Accordingly, when decorative pieces are arranged into user's favorite pattern, the user necessitates to make a new ruler suitable for his or her favorite pattern or to arrange decorative pieces completely manually without use of a ruler.

SUMMARY

Therefore, an object of the disclosure is to provide a cutting data generator which can generate cutting data used to make a sheet on which a plurality of decorative pieces is to be arranged into a desired pattern, and a cutting apparatus which can form a plurality of holes in the sheet and a cutting data generating program which can be used to form the holes in the sheet.

The disclosure provides a cutting data generator including a control device configured to obtain provisional hole arrangement data usable to arrange a plurality of provisional holes, to obtain an intercentral distance between two of the provisional holes, to connect the two provisional holes with an auxiliary hole and determine that the two provisional holes and the auxiliary hole are contained in a group, thereby extracting an outermost outline of the group of the provisional holes arranged, when the intercentral distance between the two provisional holes is not less than a sum of radii of the two provisional holes and not more than a predetermined value, and to generate cutting data usable to cut the sheet along the outline extracted. The two provisional holes are adjacent to each other. The auxiliary hole having a smaller diameter than the two provisional holes.

The disclosure also provides a cutting apparatus comprising a cutting data generator including the control device as described above and further including a cutting unit configured to cut the sheet based on the cutting data.

The disclosure further provides a non-transitory computer-readable medium storing computer-readable instructions that, when executed by a processor, cause the processor to perform the above-described operations.

BRIEF DESCRIPTION OF THE DRAWINGS

In the accompanying drawings:

FIG. 9 shows the contents of provisional hole arrangement data;

DETAILED DESCRIPTION

Figure 2:
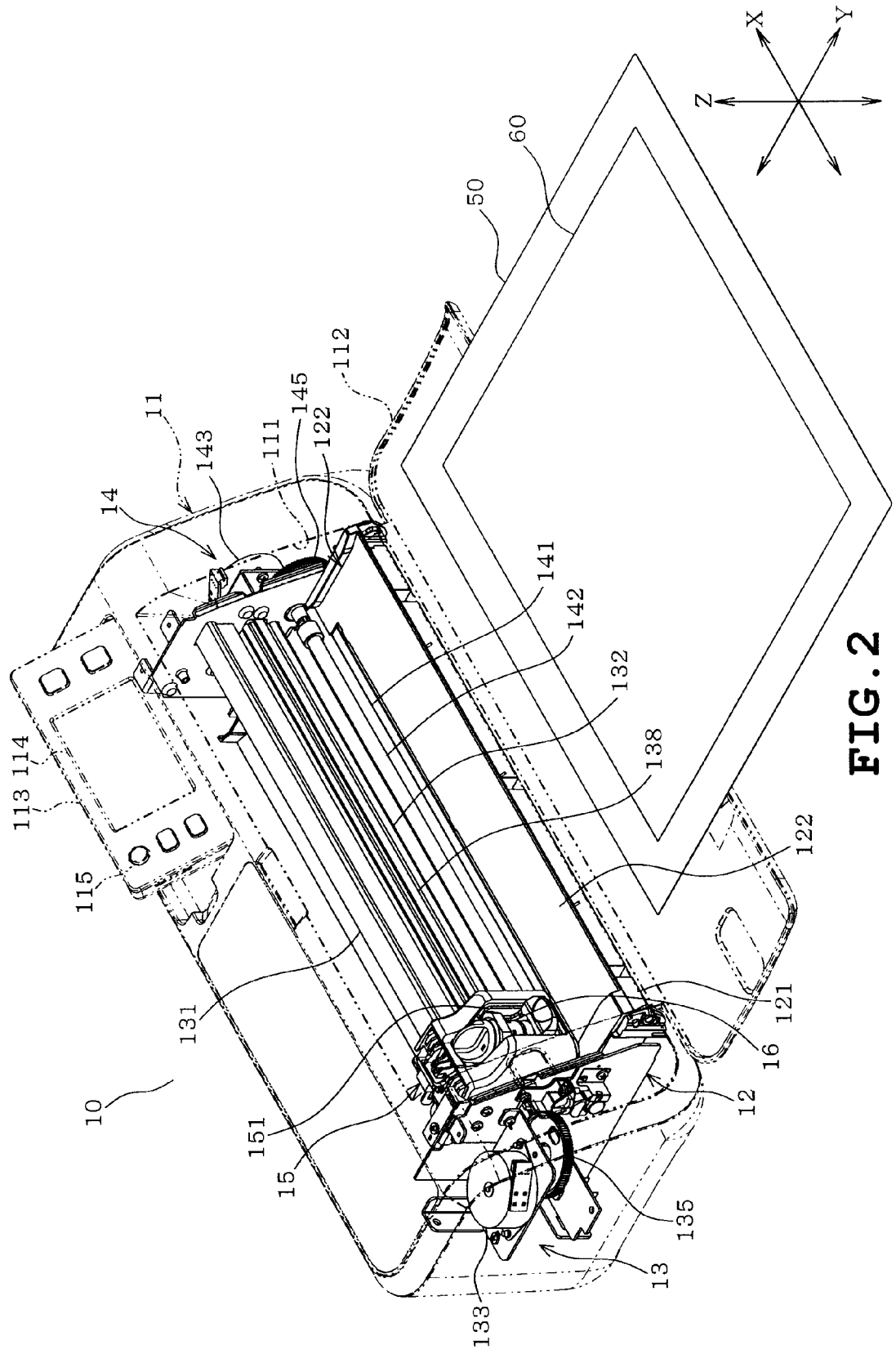
FIG. 2 is a perspective view of the cutting apparatus.
Figure 4:
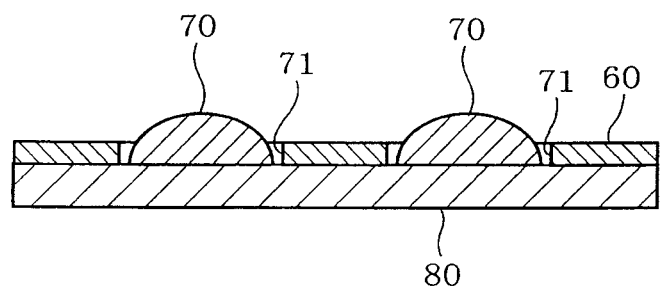
FIG. 4 is an enlarged sectional view of the sheet formed with holes in which decorative pieces are disposed respectively.

A cutting data generator, a cutting apparatus and a cutting data generating program in accordance with one example will be described with reference to the accompanying drawings. Referring first to FIG. 2, the cutting apparatus 10 is shown which is configured to cut an object 60 to be cut, held on a holding member 50, into a desired shape. The holding member 50 is formed of a flat resin sheet having an adhesive layer (not shown) on a surface thereof. The object 60 is affixed to the adhesive layer to be held on the holding member 50. A plurality of holes 71 is formed through the object 60 by the cutting apparatus 10 as shown in FIG. 4. The holes 71 are provided for arranging decorative pieces 70 on an article 60. The object 60 is a resin sheet, for example, and the article 80 is clothes or small goods, for example.

Figure 3:
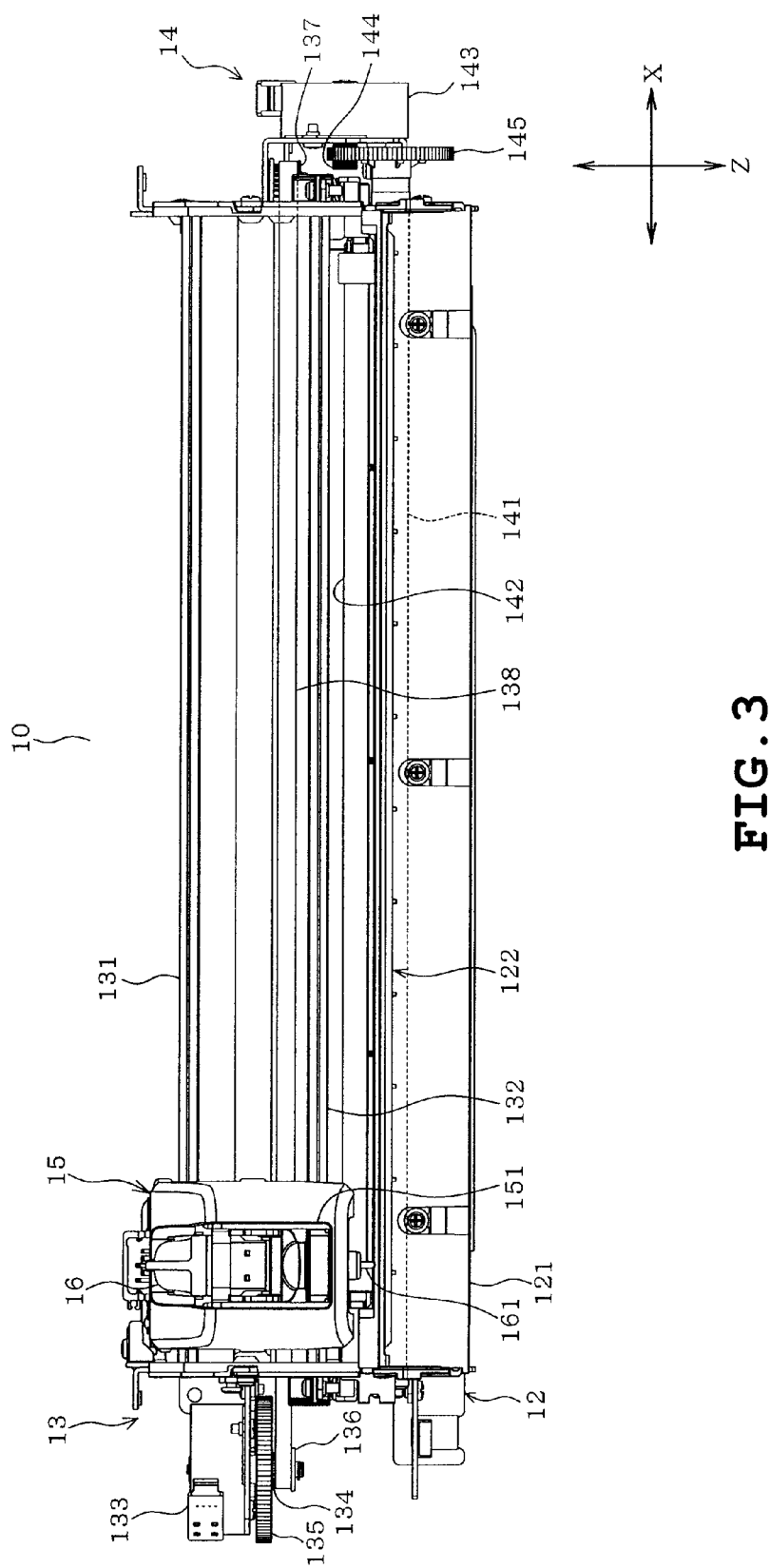
FIG. 3 is a front view of the cutting apparatus with the body cover being removed.

The cutting apparatus 10 includes a body cover 11, a body 12, an X-axis moving mechanism 13, a Y-axis moving mechanism 14, a carriage 15 and a cutter cartridge 16, as shown in FIGS. 2 and 3. The cutter cartridge 16 is detachably attached to the carriage 15. A cutter 161 having a distal end provided with a blade is replaceably attached to the cutter cartridge 16 as shown in FIG. 3.

The body cover 11 is formed into a rectangular box shape as a whole and covers the body 12, the X-axis moving mechanism 13, the Y-axis moving mechanism 14, the carriage 15 and the cutter cartridge 16. In the following description, a longitudinal direction of the body cover 11 is defined as a right-left direction of the cutting apparatus 10. A side where an opening 111 is located is referred to as a front of the cutting apparatus 10. The right-left direction of the cutting apparatus 10 is defined as an X direction and a front-rear direction of the cutting apparatus 10 is defined as a Y direction. An up-down direction of the cutting apparatus 10 is defined as a Z direction. The body cover 11 has a front formed with the above-mentioned opening 111. The body cover 11 also has a rear located opposite the opening 111. The rear of the body cover 11 is also formed with an opening (not shown) through which the holding member 50 is passable.

The body cover 11 has a front cover 112 and an operation panel 113. The front cover 112 includes a lower end at which the front cover 112 is pivotally mounted on the body cover 11, so that the body cover 11 is caused to pivot between a position (see FIG. 2) where the opening 111 is opened and a position at which the opening 111 is closed. The operation panel 113 is mounted in a top of the body cover 11 and includes a liquid crystal display 114 and a plurality of switches 115. A user operates the operation panel 113 to perform the various setting and confirmation of an operating condition.

The body 12 includes a base 121 and a receiving mechanism 122. The base 121 is mounted on the bottom of the body cover 11 and formed into a rectangular frame shape. The receiving mechanism 122 is formed into a generally horizontal flat plate shape and the object 60 is placed on the receiving mechanism 122. The receiving mechanism 122 is subjected to a pressing force a lower end of the cutter cartridge 16 imparts to the object 60 and the holding member 50 when the object 60 is cut.

The X-axis moving mechanism 13 moves the carriage 15 in the X direction or the right-left direction. The X-axis moving mechanism 13 includes a pair of upper and lower X-axis guide rails 131 and 132, an X-axis motor 133, an X-axis driving gear 134, an X-axis driven gear 135, a pair of timing pulleys 136 and 137 and a timing belt 138. The X-axis guide rails 131 and 132 are disposed one above the other, extending in parallel with each other. The X-axis motor 133 is comprised of a stepping motor, for example. The X-axis driving gear 134 receives rotation of the X-axis motor 133 thereby to be rotated together with a rotational shaft of the X-axis motor 133. The X-axis driven gear 135 is in mesh engagement with the X-axis driving gear 134.

The left timing pulley 136 is disposed below the X-axis driven gear 135 and is rotated together with the X-axis driven gear 135 with rotation of the latter. The timing belt 138 extends between the right and left timing pulleys 137 and 136. A part of the timing belt 138 is connected to the carriage 15 although not shown in detail. In the above-described construction, upon rotation of the X-axis motor 133, its rotation is transmitted via the X-axis driving gear 134, the X-axis driven gear 135 and the left timing pulley 136 to the timing belt 138. As a result, the carriage 15 is moved in the X direction, that is, the right-left direction with movement of the timing belt 138.

The Y-axis moving mechanism 14 is configured to move the object 60 held by the holding member 50 in the Y direction, that is, the front-rear direction. The Y-axis moving mechanism 14 includes a driving roller 141, a pinch roller 142, a Y-axis motor 143, a Y-axis driving gear 144 and a Y-axis driven gear 145. both the driving roller 141 and the pinch roller 142 are disposed in parallel to the X-axis guide rails 131 and 132 so that the shaft centers of the rollers 141 and 142 are directed in the right-left direction, that is, the X direction. A holding member 50 disposed between the driving roller 141 and the pinch roller 142 is configured to be pressed against the driving roller 141 by the pinch roller 142.

The Y-axis motor 143 is comprised of a stepping motor, for example. When receiving rotation of the Y-axis motor 143, the Y-axis driving gear 144 is rotated together with a rotating shaft of the Y-axis motor 143. The Y-axis driven gear 145 is mounted on a right end of the driving roller 142 and is in mesh engagement with the Y-axis driving gear 144. In the above-described construction, upon rotation of the Y-axis motor 143, its rotation is transmitted to the driving roller 141 by the Y-axis driving gear 144 and Y-axis driven gear 145. Rotation of the driving roller 141 is transmitted to the holding member 50 put between the driving roller 141 and the pinch roller 142. As a result, the holding member 50 is moved in the Y direction perpendicular to the axial direction of the driving roller 141, that is, the front-rear direction.

The carriage 15 has a cartridge holder 151 and a Z-axis moving mechanism (not shown). The cartridge holder 151 is disposed in front of the carriage 15 to hold the cutter cartridge 16 so that the cutter cartridge 16 is detachably attachable. The cutter cartridge 16 is fixed to the cartridge holder 151 while the blade of the cutter 161 is exposed as shown in FIG. 3. The Z-axis moving mechanism (not shown) is disposed in the interior of the carriage 15 to move the cartridge holder 151 together with the cutter cartridge 16 in the up-down direction, that is, the Z direction. In the above-described construction, when the cartridge holder 151 is moved downward by the Z-axis moving mechanism, a distal end of the cutter 161 attached to the cutter cartridge 16 bites into the object 60 held by the sheet-like holding member 50. With the distal end of the cutter 161 biting into the object 60, the carriage 15 is moved in the X direction by the X-axis moving mechanism 13 and the object 60 is moved in the Y direction by the Y-axis moving mechanism 14. Consequently, the object 60 is cut into a desired shape by the cutting apparatus 10. In this case, the X-axis and Y-axis moving mechanisms 13 and 14 function as a relative moving unit which moves the object 60 and the carriage 15 relative to each other. Furthermore, the X-axis moving mechanism 13, the Y-axis moving mechanism 14 and the Z-axis moving mechanism (not shown) provided on the carriage 15 function as a relative moving unit which moves the cutter 161 attached to the cutter cartridge 16 and the object 60 relative to each other.

Figure 1:
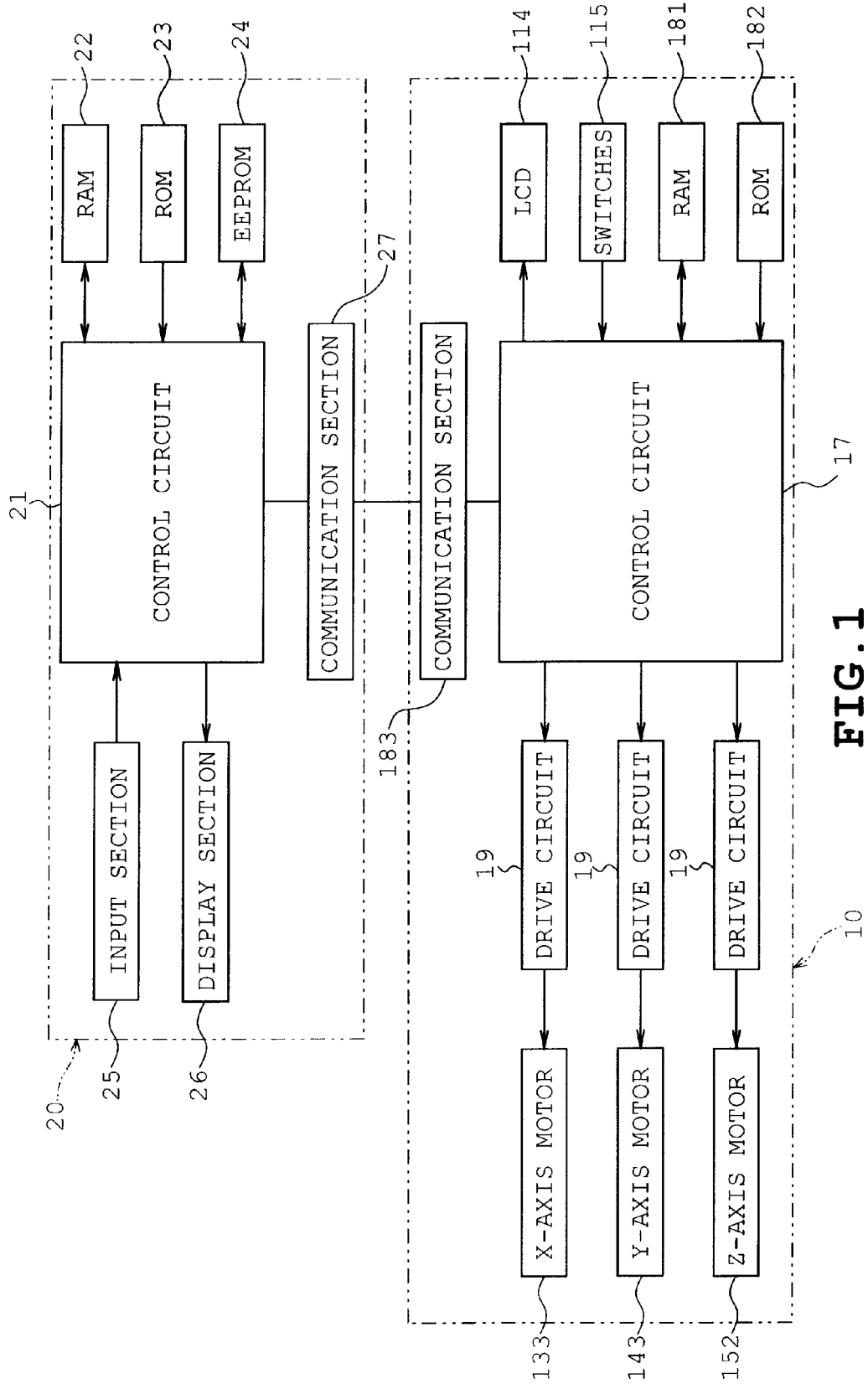
FIG. 1 is a block diagram showing an electrical configuration of the cutting apparatus and the cutting data generator in accordance with one example.

The cutting apparatus 10 includes a control circuit 17 serving as a control unit as shown in FIG. 1. The control circuit 17 is constituted by a central processing unit (CPU) and configured to control the entire cutting apparatus 10. To the control circuit 17 are connected a liquid crystal display (LCD) 114 of the operation panel 113, switches 115, a RAM 181, a ROM 182, a communication section 183 and a plurality of drive circuits 19. The RAM 131 stores cutting data for cutting the object 60 into a desirable configuration by the drive of the motors 133, 143 and 152, and the like. The ROM 182 stores a drive control program for controlling the motors 133, 143 and 152 based on the cutting data stored in the RAM 181. The communication section 183 is configured to communicate with external equipment to obtain cutting data. The drive circuits 19 are configured to drive the X-axis motor 133, the Y-axis motor 143 and the Z-axis motor 152 based on commands supplied from the control circuit 17, respectively.

The cutting data generator 20 will now be described. The cutting data generator 20 includes a personal computer configured to execute a cutting data generating program. Furthermore, the personal computer is configured to function as various processing units on the cutting data generating program. Furthermore, the cutting data generator 20 is further configured to execute a provisional hole arrangement program thereby to function as a provisional hole arrangement data generating device. The personal computer should not be limited to a general-purpose computer but may be configured as a computer dedicated to generation of cutting data. Furthermore, the cutting data generator 20 and the provisional hole arrangement data generating device may be configured independent of each other.

The cutting data generator 20 is mainly comprised of the control circuit 21 and further includes a RAM 22, A ROM 23, an EEPROM 24, an input section 25, a display section 26 and a communication section 27. The control circuit 21 is a control device constituted by a central processing unit (CPU). The RAM 22 is configured to temporarily store necessary information depending upon a program in execution. The ROM 23 stores the provisional hole arrangement program, the cutting data generating program and the like. The EEPROM 24 is configured to store provisional hole arrangement data generated by execution of the provisional hole arrangement program, cutting data generated by execution of the cutting data generating program, and the like.

The input section 25 includes an input unit, such as a mouse or a key board, which is operated by a user. The display section 26 is a liquid crystal display (LCD) and is configured to display necessary information such as message to the user. The communication section 27 configured to communicate with external equipment to transmit necessary information such as cutting data to the external equipment. In the embodiment, the communication section 27 of the cutting data generator 20 is connected by a wire to the communication section 183 of the cutting device 10. As a result, the cutting data generated by the cutting data generator 20 is transmitted to the cutting apparatus.

The communication section 27 of the cutting data generator 20 and the communication section 183 of the cutting apparatus 10 may be connected to each other by wireless communication. Delivery and receipt of cutting data between the cutting data generator 20 and the cutting apparatus 10 may be executed via a detachably attachable external memory device such as a USB memory or a network such as the Internet although the external storage device and the Internet are not shown.

When the provisional hole arrangement program is executed by the control circuit 21, the cutting data generator 20 functions as a provisional hole arrangement data generating device, generating provisional hole arrangement data D1 as shown in FIG. 9. In the generation of provisional hole arrangement data D1, the user firstly operates the input section 25 while viewing information, such as a pattern configuration, displayed on the display section 26 of the cutting data generator, thereby entering various necessary pieces of information including the sizes of decorative pieces to be arranged, for example, diameter, and a pattern on which the decorative pieces are to be arranged. The control circuit 21 is configured to arrange a plurality of provisional holes H according to the arrangement of decorative pieces in an imaginary manner within the cutting data generator 20, based on the information on the sire and the pattern shape of the decorative pieces, for example, as shown in FIGS. 5A to 8A. Each provisional hole H has a diameter set to be slightly larger than the diameter of the decorative pieces.

Figure 5A:
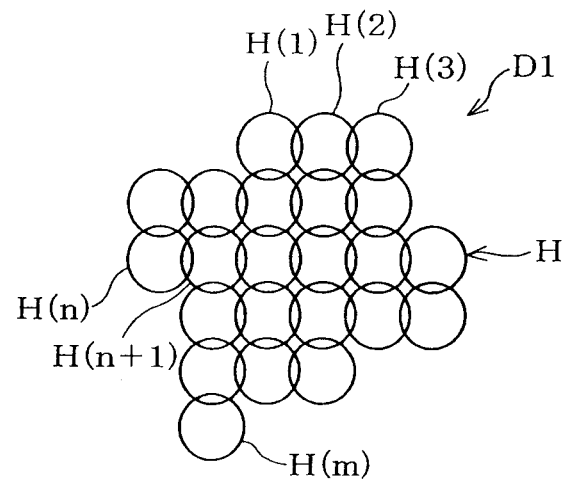
FIGS. 5A and 5B are a diagram of a first example of arrangement of provisional holes and a conceptual diagram of cutting data obtained based on the arrangement of the provisional holes in FIG. 5A, respectively.
Figure 5B:
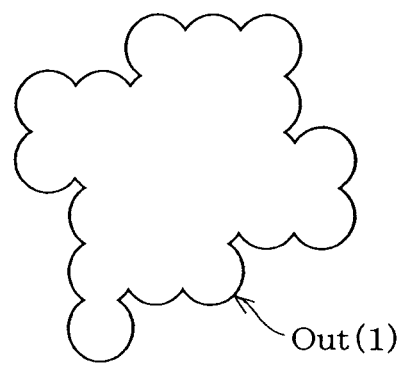
Figure 6A:
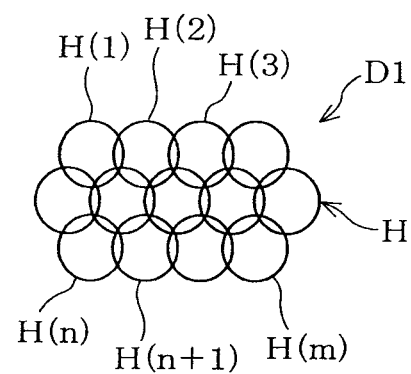
FIGS. 6A and 6B are a diagram of a second example of arrangement of provisional holes and a conceptual diagram of cutting data obtained based on the arrangement of the provisional holes in FIG. 6A, respectively.
Figure 6B:
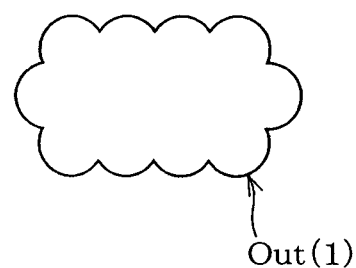
Figure 7A:
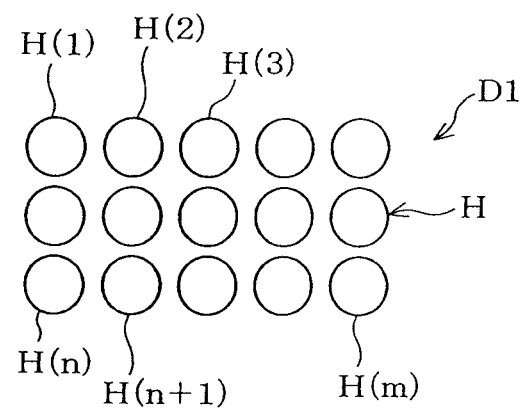
FIGS. 7A and 7B are a diagram of a third example of arrangement of provisional holes and a conceptual diagram of cutting data obtained based on the arrangement of the provisional holes in FIG. 7A, respectively.
Figure 7B:
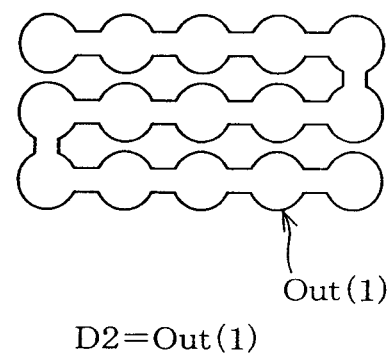
Figure 8A:
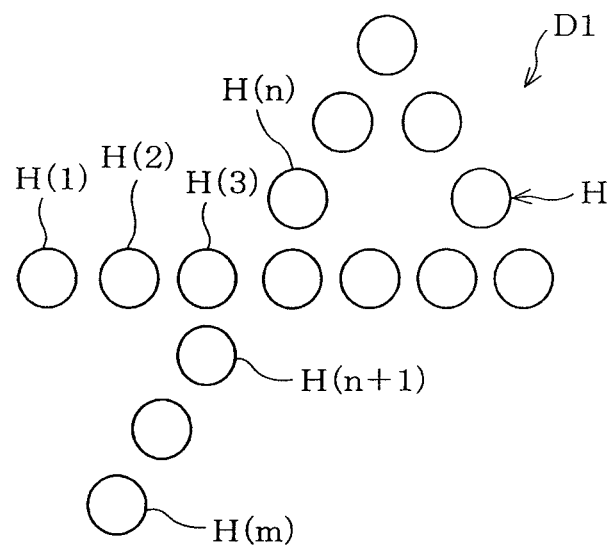
FIGS. 8A and 8B are a diagram of a fourth example of arrangement of provisional holes and a conceptual diagram of cutting data obtained based on the arrangement of the provisional holes in FIG. 8A, respectively.
Figure 8B:
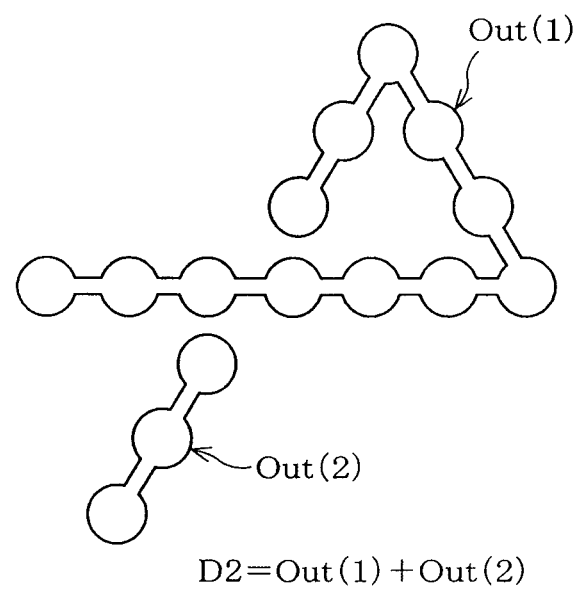

FIG. 5A show, as a first example, a case where the decorative pieces are tightly arranged in the front-rear direction and the right-left direction into a cross shape. In this arrangement, front and rear parts and right and left parts of the provisional holes H are overlapped with one another. FIG. 6A shows, as a second example, the case where the decorative pieces are diagonally arranged in the front-rear and right-left directions into an X-shape. In this arrangement, each provisional hole H has a circumference overlapping with a part of the other provisional hole H. FIG. 7A shows a third example, the case where the decorative pieces are arranged in the front-rear and right-left directions so as to be spaced away from one another at regular intervals. FIG. 8A shows a fourth example in which decorative pieces are arranged along an optional line so that adjacent decorative pieces are spaced away from one another.

Subsequently, the control circuit 21 generates provisional hole arrangement data D1 shown in FIG. 9, based on the imaginarily arranged provisional holes H as shown in FIGS. 5A, 6A, 7A and 8A. The provisional hole arrangement data D1 is composed of data on provisional holes H(n), which includes a central coordinate Cp(n) indicative of X-Y coordinates of the location of the center of each provisional hole H(n), a hole diameter of each provisional hole H, in this case, a radius R of each provisional hole R and a cutting order n of the cutting device 10. The cutting order n indicates an order of cutting to efficiently execute a cutting operation with reductions in the number of drive of the motors 133, 143 and 152, a drive time and the like.

The cutting order n is an integer equal to or larger than 1. The last of the cutting order n or the number of provisional holes H(n) is designated by "m." The cutting order n of a plurality of provisional holes H is shown as "provisional hole (n), provisional hole (n+1) . . . ." When the cutting order n need not be indicated, the wording "provisional hole(s)" is used.

The control circuit 21 executes a cutting data generation program after the provisional hole arrangement data D1 has been generated. Firstly, the cutting data generator 20 generates cutting data D2 as shown in FIGS. 5B, 6B, 7B and 8B. The cutting data D2 is indicative of a hole shape to be formed on the object 60 by driving the cutting apparatus 10. In the embodiment, a conceptual diagram of data D2 is shown as a figure Out(z). The figure Out(z) is formed by extracting an outermost outline of a group including a plurality of provisional holes H. The control circuit 21 distinguishes a plurality of provisional holes H into at least one group. Accordingly, the cutting data D2 includes at least one figure Out(z). A group number z in the figure Out(z) is used to distinguish a plurality of groups and is an integer of not less than 1.

The control circuit 21 extracts the figure Out(z) in the following manner, obtaining cutting data D2. More specifically, the control circuit 21 imaginarily arranges provisional holes H(n) in a cutting order n, based on the provisional hole arrangement data D1. In this case, the control circuit 21 incorporates a next provisional hole H(n+1) into the provisional hole H(n) to enlarge the group of provisional holes H, extracting the outline of the group sequentially in the cutting order n. The control circuit 21 finally extracts outermost outlines of the respective groups as a figure Out (z) regarding at least one group including provisional holes (1) to (m). As a result, the control circuit 21 then outputs, as cutting data D2, figures Out (z) of all the extracted set numbers z. In this case, the control circuit 21 functions as a cutting data generating unit.

Figure 10:
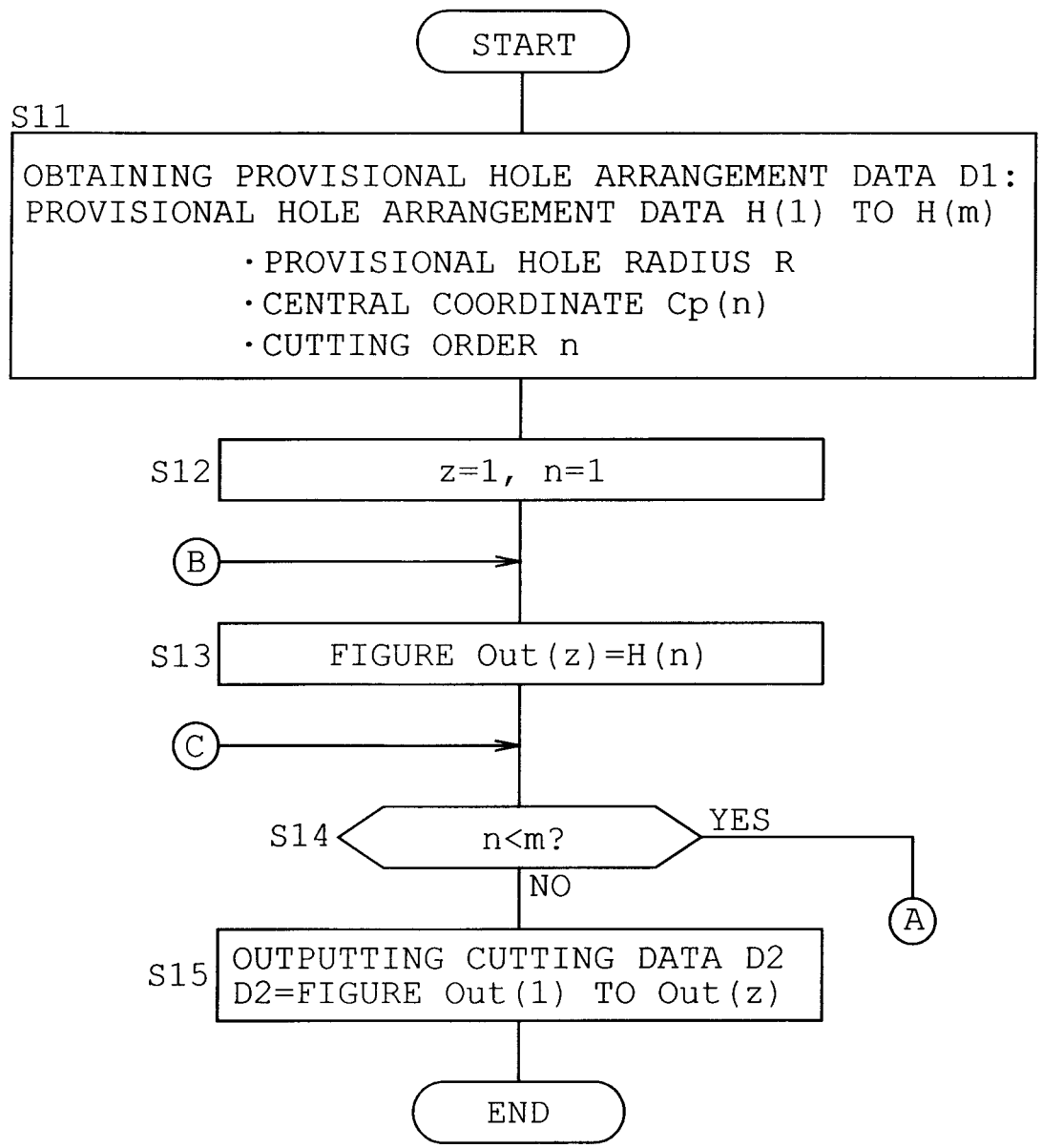
FIG. 10 is a first flowchart showing processing contents of the cutting data generating program on which the cutting data generator operates.

More specifically, upon execution of the cutting data generation program, the control circuit 21 obtains provisional hole arrangement data D1 at step S11 of the flowchart of FIG. 10. In this case, the control circuit 21 functions as a data obtaining unit which obtains provisional hole arrangement data. Next, the control circuit 21 proceeds to step S12 to set both the group number z and a cutting order n to 1 as initial values. The control circuit 21 then proceeds to step S13 to set figure Out(z) to Out(z)=H(n), in this case, figure Out(1)=H(1).

The control circuit 21 subsequently determines, at step S14, whether or not the cutting order (n) of provisional holes H(n) in process has reached the total number m. When the cutting order (n) of provisional holes H(n) in process has not reached the total number m (YES at step S14), the control circuit 21 proceeds to step S21 shown in FIG. 11. At step S21, the control circuit 21 obtains central coordinate Cp(n) of the provisional hole H(n) and central coordinate Cp(n+1) of provisional hole H(n+1).

Subsequently, the control circuit 21 proceeds to step S22 to determine whether or not two provisional holes H, that is, the provisional holes H(n) and H(n+1) to be cut in this sequence belong to one group or different groups. More specifically, the control circuit 21 determines whether or not the next provisional hole H(n+1) belongs to the figure Out(z) to which the provisional hole H belongs. The determination is based on an intercentral or center-to-center distance L of the provisional holes H(n) and H(n+1) and the sizes of the provisional holes H, in this case, the radii R. When the intercentral distance L between the provisional holes H(n) and H(n+1) is larger than a predetermined value, the control circuit 21 determines that the provisional holes H(n) and H(n+1) belong to different groups, processing on the basis of the determination. On the other hand, when the intercentral distance L between the provisional holes H(n) and H(n+1) is not more than the predetermined value, the control circuit 21 determines that the provisional holes H(n) and H(n+1) belong to one group, processing on the basis of the determination.

More specifically, at step S22, the control circuit 21 compares the intercentral distance L between the provisional holes H(n) and H(n+1). When the intercentral distance L is larger than a predetermined value, for example, quadruple of the radius R (YES at step S22), the control circuit 21 determines that the provisional holes H(n) and H(n+1) belong to different groups, proceeding to step S23.

At step S23, the control circuit 21 sets the group number z to z+1, in this case, z=1+1=2 and further sets a figure Out(z) to Out(z)=(2), which will be a next group. Furthermore, the control circuit 21 sets the cutting order n to n+1, in this case, n=1+1=2, further setting the next provisional hole H(n) to a provisional hole H(2). The control circuit 21 subsequently proceeds to step S13 in FIG. 10. On the other hand, when the intercentral distance L is not more than a predetermined value, for example, the quadruple of the radius R (NO at step S22), the control circuit 21 determines that the provisional holes H(n) and H(n+1) belong to one group, proceeding to step S24.

Figure 11:
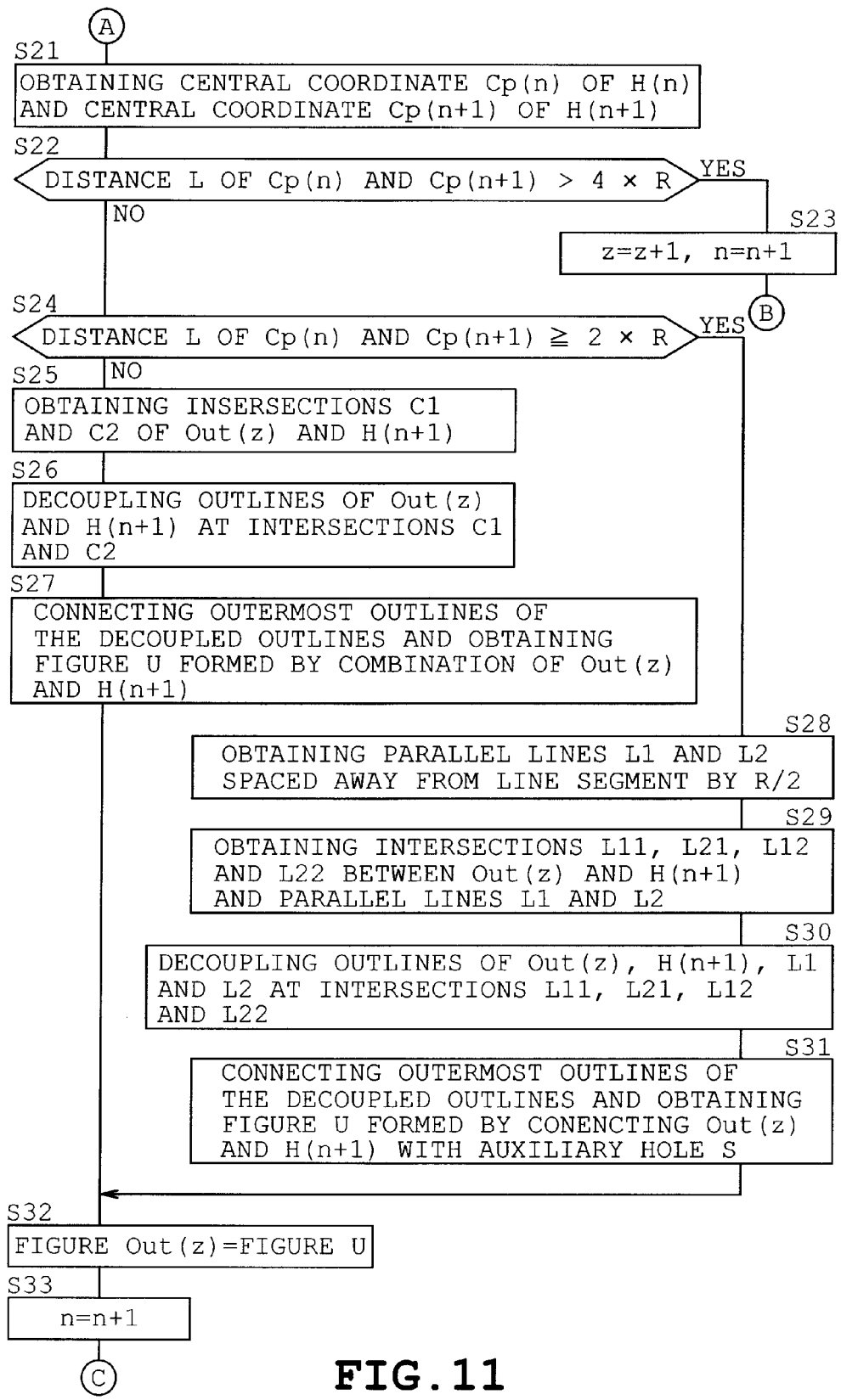
FIG. 11 is a second flowchart showing processing contents of the cutting data generating program on which the cutting data generator operates.
Figure 12A:
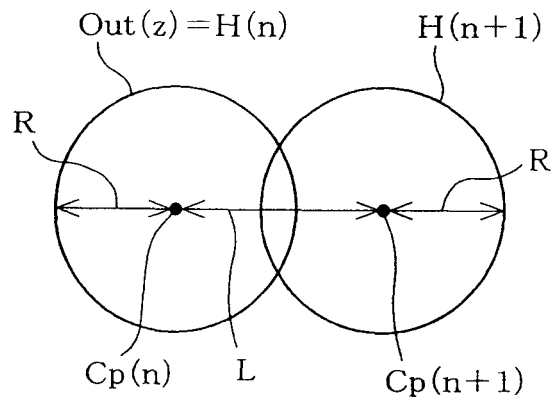
FIGS. 12A to 12C are diagrams of two adjacent provisional holes overlapping with each other, sequentially showing processing contents of the cutting data generating program.
Figure 12B:
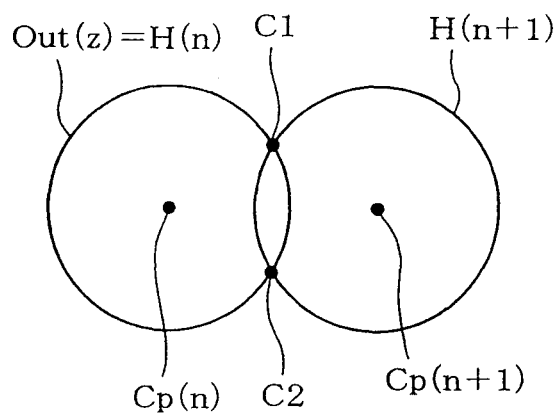
Figure 12C:
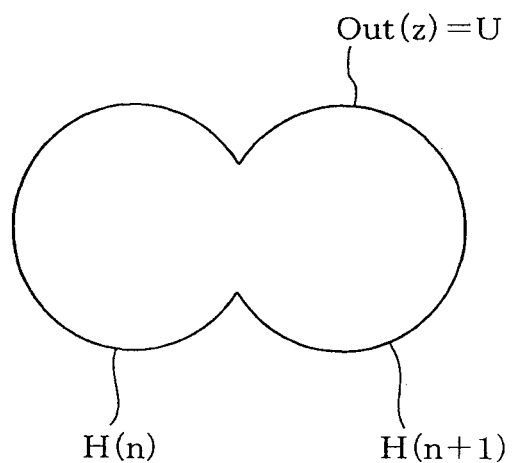
Figure 13A:
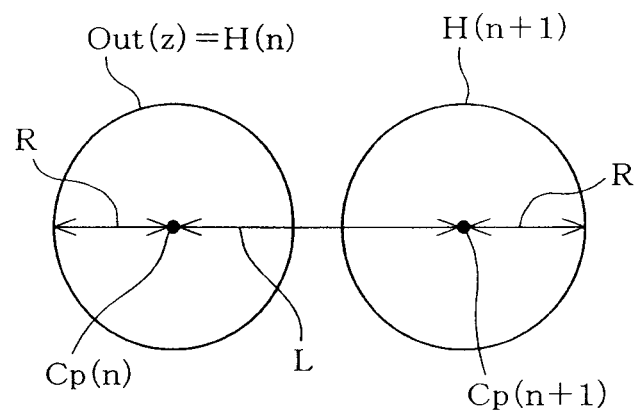
FIGS. 13A to 13C are diagrams of two adjacent provisional holes separated from each other in the case where separation distance is not more than a predetermined value, sequentially showing processing contents of the cutting data generating program.
Figure 13B:
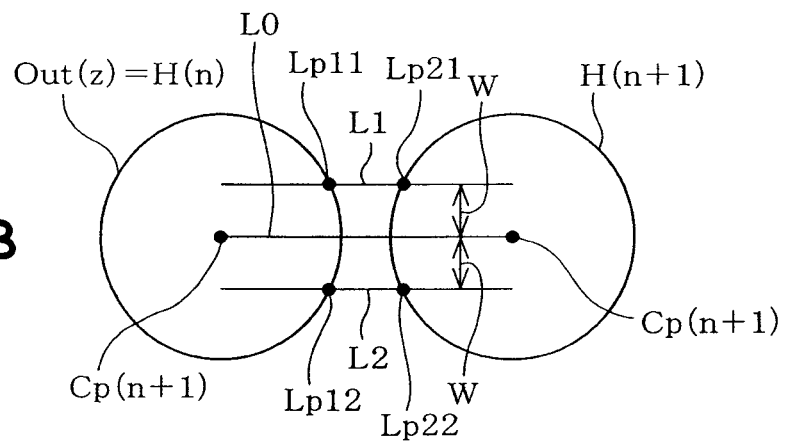
Figure 13C:
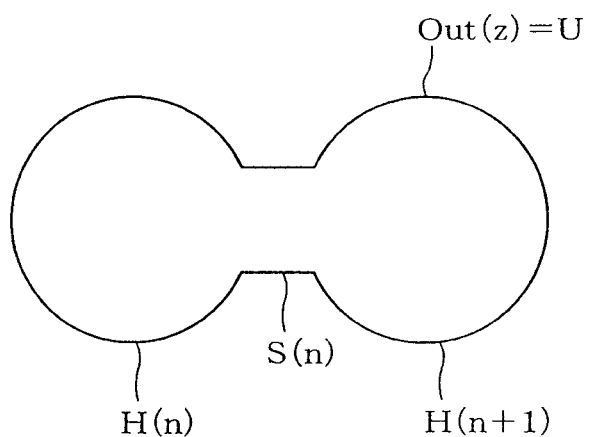
Figure 14A:
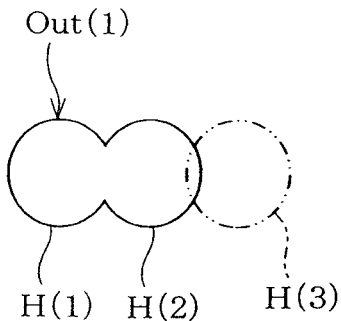
FIGS. 14A to 14F are diagrams of a plurality of adjacent provisional holes overlapping with one another, sequentially showing processing contents of the cutting data generating program.
Figure 14B:
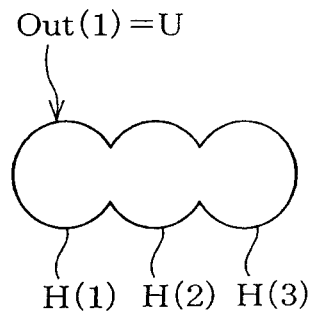
Figure 14C:
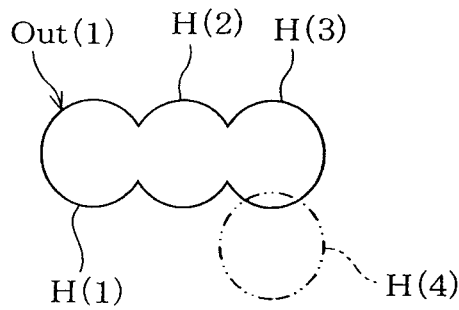
Figure 14D:
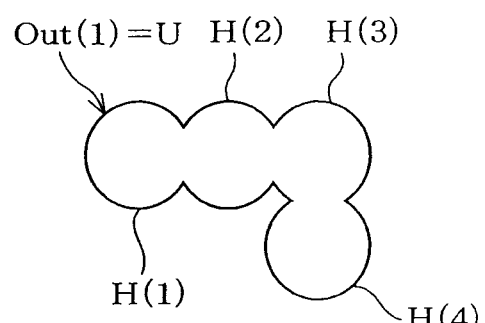
Figure 14E:
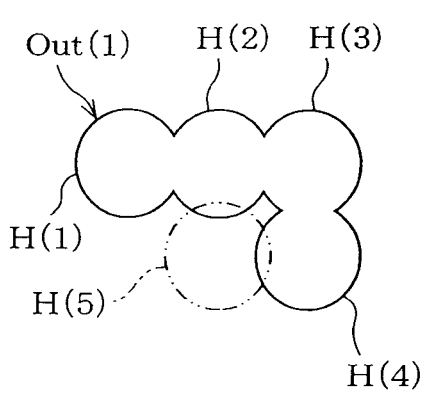
Figure 14F:
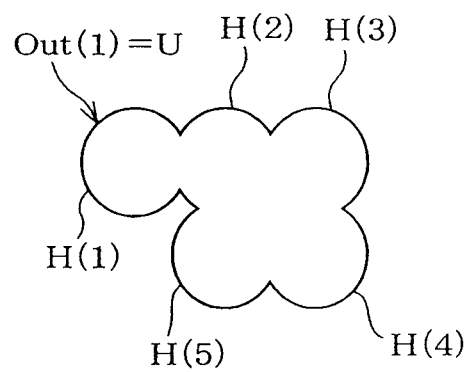

At step S24, the control circuit 21 determines whether or not two provisional holes H(n) and H(n+1) to be cut in this sequence are to be synthesized or combined as shown in FIG. 12C or to be connected by an auxiliary hole S(n) as shown in FIG. 13C. More specifically, at step S24 in FIG. 11, the control circuit 21 determines whether or not the figure Out(z) including the provisional hole H(n) and the next provisional hole H(n+1) overlap with each other. The determination is based on the intercentral distance L between the provisional holes H(n) and H(n+1) and the radii R of provisional holes H.

When the intercentral distance L between the provisional holes H(n) and H(n+1) is less than the double of the radius R (NO at step S24), the control circuit 21 determines that the provisional holes H(n) and H(n+1) overlap with each other. The control circuit 21 then executes steps S25 to S27, thereby forming a group including the next provisional hole H(n+1) from the figure Out(z) including the provisional hole H(n). The control circuit 21 then obtains a figure U which is an outermost outline of the group. The figure Out(z) is a figure represented by the outermost outline of the group composed of the provisional holes H(1) to H(n). Furthermore, the figures Out(z) shown in FIGS. 12A to 13C represent only parts corresponding to provisional hole H8(n) of the entire figure Out(z) for the sake of simplification in the drawing.

When determining that the figure Out(z) or provisional hole H(n) and the next provisional hole H(n+1) overlap with each other as shown in FIG. 12A (NO at step S24), the control circuit 21 proceeds to step S25 to obtain intersection points C1 and C2 of the figure Out(z) or the provisional Hole (n) and the provisional hole H(n+1). Subsequently, the control circuit 21 proceeds to step S26 to decouple the outlines of the figure Out(z) and the provisional hole H(n+1) at the intersections C1 and C2.

At step S27, the control circuit 21 connects the outermost outlines of the figure Out(z) and the provisional hole H(n+1) decoupled at step S26, thereby obtaining a figure U as shown in FIG. 12C. In this case, the figure U obtained at step S27 includes the provisional hole H(n+1) as well as the figure Out(z). In other words, the figure U is composed of the outermost outline of a group of two provisional holes H(n) and H(n+1).

On the other hand, when the intercentral distance L between the provisional holes H(n) and H(n+1) is not less than the double of radius R as shown in FIG. 13A (YES at step S24), the control circuit 21 determines that the provisional holes H(n) and H(n+1) are separated from each other.

The control circuit 21 then executes steps S28 to S31. Consequently, the control circuit 21 connects the figure Out(z) and the provisional hole H(n+1) with an auxiliary hole S(n), thereafter obtaining an outermost outline of a group of the figure Out(z), the provisional hole H(n+1) and the auxiliary hole S(n).

More specifically, when determining that the figure Out(z) and the provisional hole H(n+1) are separated from each other as shown in FIG. 13A (YES at step S24), the control circuit 21 proceeds to step S28. At step S28, the control circuit 21 obtains a line segment L0 between the center Cp(n) of the provisional hole H(n) and the center Cp(n+1) of the provisional hole H(n+1) as shown in FIG. 12B. The control circuit 21 also obtains line segments L1 and L2 which are parallel to each other and are spaced away from the line segment L0 by a predetermined distance W. The distance W is set so as to be larger than 0 and equal to or smaller than the radius R. In this case, the distance W is set to a half of the radius R.

The control circuit 21 subsequently proceeds to step S29 to obtain an intersection Lp11 of the figure Out(z) or the provisional hole H(n) and the parallel line L1, an intersection Lp12 of the figure Out(z) or the provisional hole H(n) and the parallel line L2, an intersection Lp21 of the provisional hole H(n+1) and the parallel line L1 and an intersection Lp22 of the provisional hole H(n+1) and the parallel line Lp22. At step S30, the control circuit 21 then decouples outlines of figure Out(z), the provisional hole H(n+1) and the parallel lines L1 and L2 at the intersections Lp11, Lp12, Lp21 and Lp22. The control circuit 21 subsequently proceeds to step S31 to connect outermost outlines of the figure Out(z), the provisional hole H(n+1) and the parallel lines L1 and L2 all decoupled at step S30 thereby to obtain a figure U.

The figure Out(z) obtained at step S31 is composed of line segments connecting the figure Out(z), the provisional hole H(n+1) and the intersections Lp11 and Lp21 and a line segment connecting the intersections Lp12 and Lp22. In this case, an auxiliary hole S(n) is formed by connecting the intersections Lp11, Lp12, Lp21 and Lp22. More specifically, the control circuit 21 executes steps S2S to S31 to connect two provisional holes H(n) and H(n+1) adjacent to each other with the auxiliary hole S(n). The control circuit 21 then regards the provisional holes H(n) and H(n+1) and the auxiliary hole S(n) as a group, obtaining the figure U composed of the outermost outline of the group.

The control circuit 21 then proceeds to step S32 to substitute the figure U obtained at step S27 or S31 for the figure Out(z). Thereafter, the control circuit 21 sets the current cutting order n to (n+1) at step S33 in order to carry out processing about a next provisional hole H(n+1), proceeding to step S14 as shown in FIG. 10. The control circuit 21 repeats steps S14, S15 and steps S21 to S33 as shown in FIG. 11 thereby to execute the above-described processing until the cutting order n reaches the total number m. When the cutting order n is no longer less than the total number m (NO at step S14), the control circuit 21 determines that all the provisional holes H(n) have been processed, proceeding to step S15. The control circuit 21 outputs cutting data D2 based on figure Out(1) to figure Out(z) with respect to all the group numbers z obtained by the above-described processing.

According to the above-described processing manner, the control circuit 21 sequentially retrieves the provisional holes H(1), H(2) . . . and H(5) for the figure Out(1), as shown in FIGS. 14A to 14F when a plurality of provisional holes H partially overlap with each other as shown in FIG. 5 or 6. Thus, the control circuit 21 sequentially enlarges the figure Out(1) as a group of the provisional holes H and finally extracts, as the figure Out(1), the outermost outline of the group including a plurality of provisional holes H.

Figure 15A:
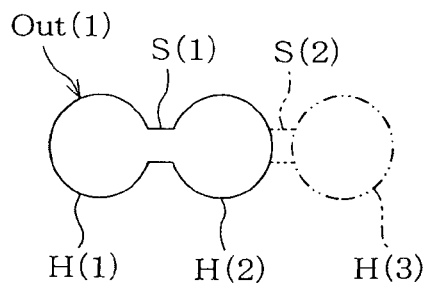
FIGS. 15A to 15F are diagrams of a plurality of adjacent provisional holes separated from each other in the case where separation distances are not more than the predetermined value, sequentially showing processing contents of the cutting data generating program.
Figure 15B:
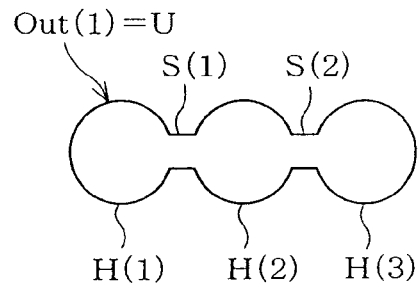
Figure 15C:
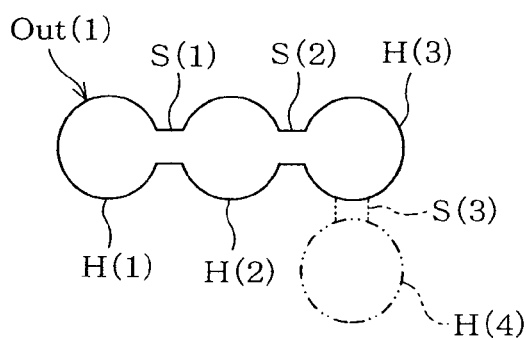
Figure 15D:
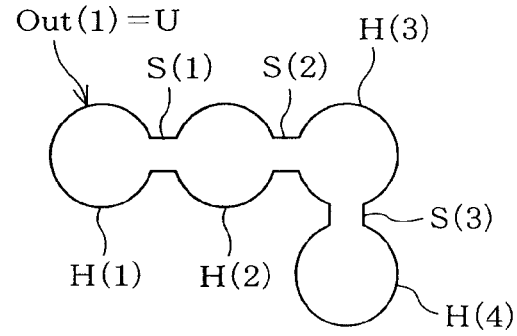
Figure 15E:
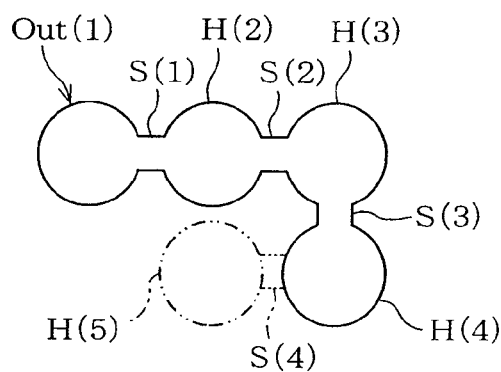
Figure 15F:
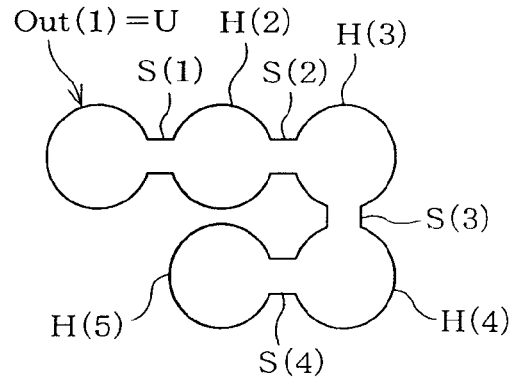

Furthermore, when the intercentral distance L between the provisional holes H(n) and H(n+1) next to each other in the cutting order n is larger than the radius R of the provisional hole H and not more than the predetermined value, the control circuit 21 connects the figure Out(1) including the provisional hole H(2) and the next provisional hole H(3) with the auxiliary hole S(2), for example, as shown in FIGS. 15A and 15B. The control circuit 21 then includes the provisional hole H(3) next to the provisional hole H(2) and the auxiliary hole H(2) into one group and retrieves the group into the figure Out(1). The control circuit 21 repeats the above-described processing to sequentially retrieve the provisional hole H(4), the auxiliary hole S(3), the provisional hole H(5) and the auxiliary hole S(4) into the figure Out(1). Thus, the control circuit 21 sequentially includes the provisional hole H(n+1) and the auxiliary hole S(n) into one group, sequentially enlarging the figure Out(1). The control circuit 21 finally extracts, as the figure Out(1), the outermost outline of the group including a plurality of provisional holes H and a plurality of auxiliary holes S.

The following will describe the case where the intercentral distance L between two provisional holes H(n) and H(n+1) having cutting orders n next to each other, in a plurality of provisional holes H is larger than the predetermined value as shown in FIG. 8A. For example, the provisional holes H(1) and H(2) partially overlap with each other, and the provisional holes H(2) and H(3) also partially overlap with each other, as shown in FIGS. 16A to 16F. The provisional holes H(4) and H(5) further partially overlap with each other. On the other hand, the intercentral distance L between the provisional holes H(3) and H(4) is larger than the predetermined value.

Figure 16A:
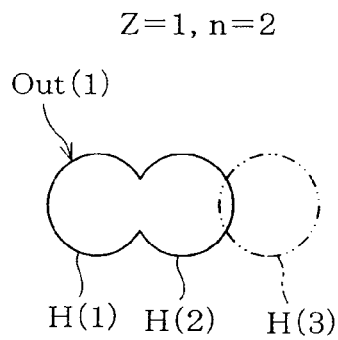
FIGS. 16A to 16F are diagrams or a plurality of provisional holes in the case where the provisional holes are divided into two or more groups, sequentially showing processing contents of the cutting data generating program.
Figure 16B:
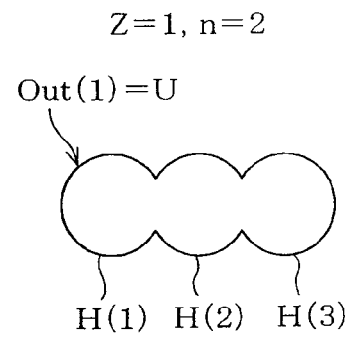
Figure 16C:
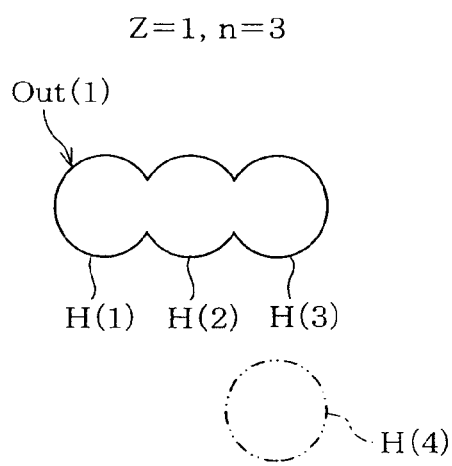
Figure 16D:
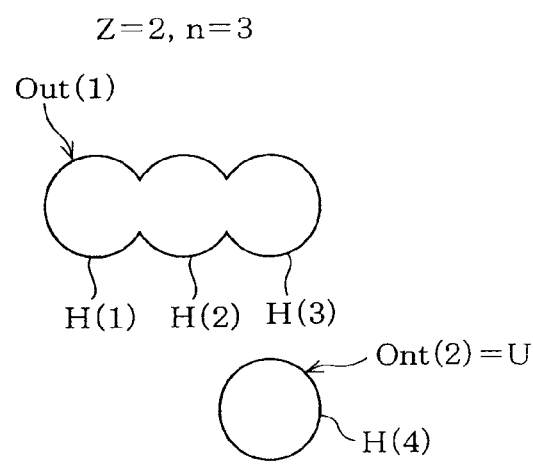
Figure 16E:
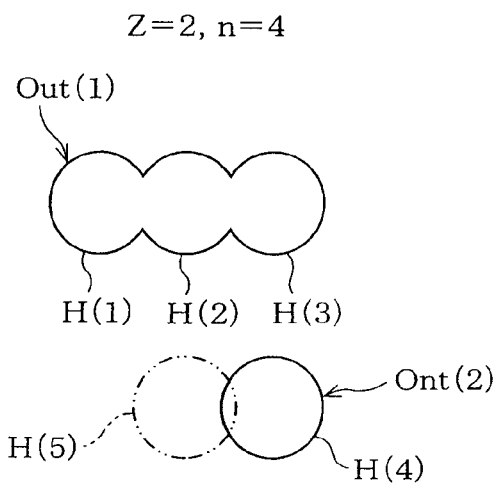
Figure 16F:
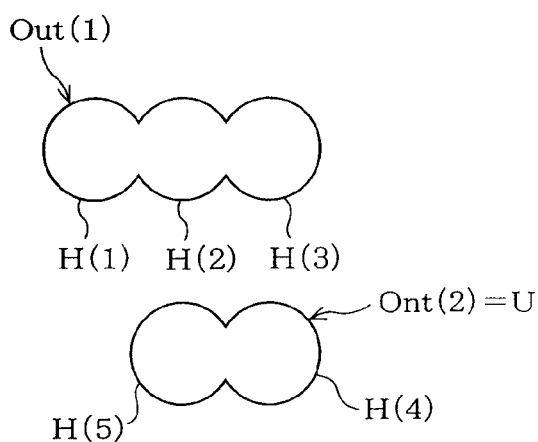

In this case, the control circuit 21 extracts an outermost outline of a group including the provisional holes H(1), H(2) and H(3) as the figure Out(1), as shown in FIGS. 16A and 16B. Since the intercentral distance between the provisional holes H(3) and H(4) is larger than the predetermined value, the control circuit 21 subsequently sets the group number z to 2 (z=2) to change the figure Out(1) to the next group. The control circuit 21 then extracts as the figure Out(2) an outermost outline of a group including the provisional holes H(4) and H(5) as shown in FIGS. 16C to 16F.

According to the above-described control manner, the control circuit 21 of the cutting data generator 20 functions as a data obtaining unit which obtains provisional hole arrangement data D1 to arrange a plurality of provisional holes H to form holes for arranging the decorative pieces 70. The control circuit 21 further functions as an outline extraction unit which extracts the figure Out(z) which is an outermost outline of a group of a plurality of provisional holes H, based on the provisional hole arrangement data D1 obtained by the data obtaining unit. The control circuit 21 further functions as a cutting data generation unit which generates cutting data D2 to cut a sheet along the figure Out(z) which becomes the outline extracted by the outline extraction unit. As a result, the cutting data D2 can be generated which is usable to make a sheet on which a plurality of decorative pieces 70 is arranged into a desirable pattern.

The control circuit 21 serving as the outline extraction unit is configured to constitute a group including a plurality of provisional holes H, based on the provisional hole arrangement data D1. The control circuit 21 is further configured to extract the figure Out(z) which is an outermost outline of the group. Accordingly, a hole shape based on the cutting data D2 becomes a single large hole formed by combining the plural provisional holes H. Consequently, the decorative pieces 70 are necessarily arranged so as to be spaced away from each other when a plurality of provisional holes H is formed individually. However, the above-described configuration can render it possible to tightly arrange the decorative pieces 70 substantially without any space between decorative pieces.

Furthermore, when driven based on cutting data on which a plurality of provisional holes H is formed individually, the Z-axis motor 152 of the cutting apparatus 10 needs to be driven to move the cutter 161 in the up-down direction every time one hole is out. This requires much time. On the other hand, according to the above-described configuration, a hole to be cut based on the cutting data D2 is a single large hole formed by combining a plurality of provisional holes H. Accordingly, the cutting apparatus 10 can cut a plurality of provisional holes H collectively as a group but is not configured to cut the provisional holes H one by one. As a result, the cutting apparatus 10 does not need to cut a large number of holes repeatedly and can accordingly reduce a cutting time.

Furthermore, the above-described cutting manner produces substantially no chips of cut insides of a large number of holes since a large number of small holes need not be cut. Thus, the user may only remove the cut part as the group of provisional holes with the result that the time required to dispose of the chips can be reduced.

The above-described example should not be restrictive but may be modified or expanded. The cutting data generator 20 may not be configured with the personal computer. For example, the cutting data generator 20 may be provided or incorporated in the cutting apparatus 10.

Although the cutting apparatus 10 is provided with the cutter 161 as a means for cutting the object 60 in the foregoing example, the cutting means may be electrical discharge or laser, instead of the cutter 161.

The plural provisional holes H may have different shapes or different sizes, namely, different radii R.

The auxiliary hole S should not be limited to the linear shape but may have an elliptical shape, for example.

Although the cutting data generator 20 stores instructions executed on the cutting data generation program, the instructions may be stored in a non-transitory computer-readable medium (storage medium) such as a USB memory, a CD-ROM, a flexible disc, a DVD or a flash memory. In this case, when the cutting data generator 20 reads the instructions stored in the storage medium to execute the instructions, the same operation and advantageous effects as described above can be achieved.

The foregoing description and drawings are merely illustrative of the present disclosure and are not to be construed in a limiting sense. Various changes and modifications will become apparent to those of ordinary skill in the art. All such changes and modifications are seen to fall within the scope of the appended claims.

What is claimed is:

1. A cutting data generator comprising:
   a control device configured to:
      obtain provisional hole arrangement data usable to arrange a plurality of provisional holes, the provisional hole arrangement data including data of center positions and diameters of the provisional holes;
      arrange the provisional holes based on the obtained provisional hole arrangement data;
      obtain an intercentral distance between two of the provisional holes, said two provisional holes being adjacent to each other;
      connect the two provisional holes with an auxiliary hole and determine that the two provisional holes and the auxiliary hole are contained in a group, thereby extracting an outermost outline of the group of the provisional holes arranged, when the intercentral distance between the two provisional holes is not less than a sum of radii of the two provisional holes and not more than a predetermined value, the auxiliary hole having a smaller diameter than the two provisional holes; and
      generate cutting data usable to cut a sheet along the outline extracted.

2. The device according to claim 1, wherein when the intercentral distance between the two provisional holes is smaller than a sum of radii of the two provisional holes, the control device is configured to determine that the two provisional holes are contained in the group of the provisional holes, thereby extracting the outline.

3. The device according to claim 1, wherein when the intercentral distance between the two provisional holes is larger than a predetermined value, the control device is configured to determine that the two provisional holes are contained in different groups, thereby extracting the outlines of the respective groups.

4. The device according to claim 1, wherein the provisional hole arrangement data includes data of a cutting order in which the provisional holes are cut, and the control device is configured to sequentially extract the outline in the cutting order.

5. A cutting apparatus comprising:
   a cutting data generator including a control device configured to:
      obtain provisional hole arrangement data usable to arrange a plurality of provisional holes, the provisional hole arrangement data including data of center positions and diameters of the provisional holes;
      arrange the provisional holes based on the obtained provisional hole arrangement data;
      obtain an intercentral distance between two of the provisional holes, said two provisional holes being adjacent to each other;
      connect the two provisional holes with an auxiliary hole and determine that the two provisional holes and the auxiliary hole are contained in a group, thereby extracting an outermost outline of the group of the provisional holes arranged, when the intercentral distance between the two provisional holes is not less than a sum of radii of the two provisional holes and not more than a predetermined value, the auxiliary hole having a smaller diameter than the two provisional holes; and
      generate cutting data usable to cut a sheet along the outline extracted.

6. The apparatus according to claim 5, wherein when the intercentral distance between the two provisional holes is smaller than a sum of radii of the two provisional holes, the control device is configured to determine that the two provisional holes are contained in the group of the provisional holes, thereby extracting the outline.

7. The apparatus according to claim 5, wherein when the intercentral distance between the two provisional holes is larger than a predetermined value, the control device is configured to determine that the two provisional holes are contained in different groups, thereby extracting the outlines of the respective groups.

8. The apparatus according to claim 5, wherein the provisional hole arrangement data includes data of a cutting order in which the provisional holes are cut, and the control device is configured to sequentially extract the outline in the cutting order.

9. A non-transitory computer-readable storage medium storing computer-readable instructions that, when executed by a processor, cause the processor to perform the steps of:
obtaining provisional hole arrangement data usable to arrange a plurality of provisional holes, the provisional hole arrangement data including data of center positions and diameters of the provisional holes;
arranging the provisional holes based on the obtained provisional hole arrangement data;
obtaining an intercentral distance between two of the provisional holes, said two provisional holes being adjacent to each other;
connect the two provisional holes with an auxiliary hole and determine that the two provisional holes and the auxiliary hole are contained in a group, extracting an outermost outline of the group of the provisional holes arranged, when the intercentral distance between the two provisional holes is not less than a sum of radii of the two provisional holes and not more than a predetermined value, the auxiliary hole having a smaller diameter than the two provisional holes; and
generating cutting data usable to cut a sheet along the outline extracted.

10. The storage medium according to claim 9, which further stores computer-readable instructions that, when executed by the processor, cause the processor to perform the step of:
determining that the two provisional holes are contained in the group of the provisional holes, thereby extracting the outline, when the intercentral distance between the two provisional holes is smaller than a sum of radii of the two provisional holes.

11. The storage medium according to claim 9, which further stores computer-readable instructions that, when executed by the processor, cause the processor to perform the step of:
determining that the two provisional holes are contained in different groups, thereby extracting the outlines of the respective groups, when the intercentral distance between the two provisional holes is larger than a predetermined value.

12. The storage medium according to claim 9, wherein the provisional hole arrangement data includes data of a cutting order in which the provisional holes are cut, and which further stores computer-readable instructions that, when executed by the processor, cause the processor to perform the step of sequentially extracting the outline in the cutting order.

* * * * *